United States Patent [19]

Beall

[11] Patent Number: 4,787,127
[45] Date of Patent: Nov. 29, 1988

[54] COMBINATION SLOT MORTISING, HORIZONTAL BORING, ROUTER TABLE AND OVERARM ROUTER MACHINE

[76] Inventor: Jerrold R. Beall, 541 Swans Rd., N.E., Newark, Ohio 43055

[21] Appl. No.: 28,244

[22] Filed: Mar. 20, 1987

[51] Int. Cl.⁴ ............................................. B23C 7/00
[52] U.S. Cl. ................................... 29/26 A; 29/560; 144/1 G; 144/134 A; 408/20; 408/24; 409/226; 409/229
[58] Field of Search .................... 144/1 R, 3 R, 35 R, 144/1 G, 134 A, 134 C; 408/20, 21, 22, 24, 62, 65, 69; 409/163, 164, 174, 219, 226, 227, 228, 229; 29/26 A, 560, 560.1

[56] References Cited

U.S. PATENT DOCUMENTS

| | | | |
|---|---|---|---|
| 353,510 | 11/1886 | Shimer | 144/134 A |
| 1,982,025 | 11/1934 | Russell | 408/62 |
| 2,166,831 | 7/1939 | Wazac, Jr. | 408/65 |
| 2,582,573 | 1/1952 | Von Gunten | 144/134 A |
| 3,099,298 | 7/1963 | Bellini | 144/1 R |
| 3,332,321 | 7/1967 | Jacobsen | 409/228 |
| 3,470,789 | 10/1969 | Morse | 408/20 |
| 3,771,579 | 11/1973 | Heuze | 29/560 |
| 3,977,127 | 8/1976 | Mahnken | 144/1 R |
| 4,163,465 | 8/1979 | Strong | 144/87 |
| 4,174,917 | 11/1979 | Brower | 408/62 |
| 4,537,234 | 8/1985 | Onsrud | 144/134 A |
| 4,593,735 | 6/1986 | Wirth, Jr. | 144/144 |

FOREIGN PATENT DOCUMENTS 404517  1/1943  Italy ..................... 144/35 R

OTHER PUBLICATIONS

Multi-Router Brochure, Nov. 18, 1986.
Woodcraft ® 1986–1987 Catalog, p. 24.

*Primary Examiner*—Gil Weidenfeld
*Assistant Examiner*—Daniel W. Howell
*Attorney, Agent, or Firm*—John S. Pratt

[57] ABSTRACT

A combination woodworking machine for attachment to an electric plunge router, which may be configured as a horizontal boring and slot mortising machine, an overarm router and a router table. An x-y-z table is mounted on a column supported by feet, and a plunge router with its base removed is mounted in various orientations on the column by sliding it onto steel dowels mounted on the column. An electronic speed control reduces the router speed for boring, and an electronic digital readout provides accurate measurement of horizontal movement of the table.

10 Claims, 3 Drawing Sheets

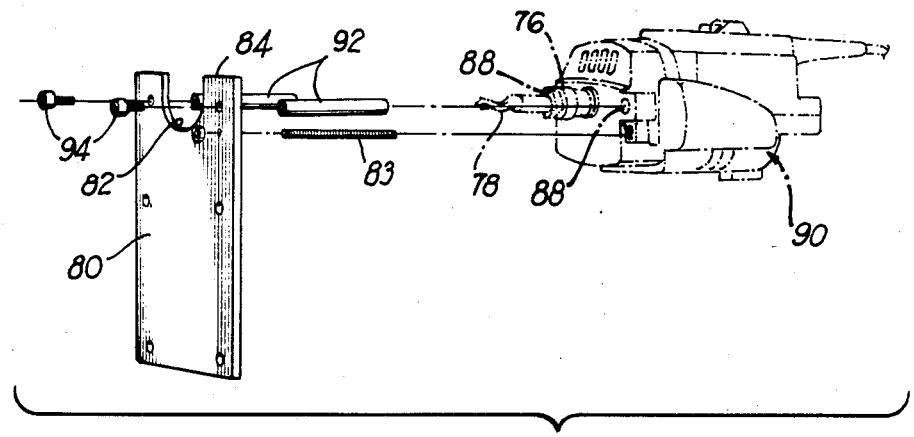
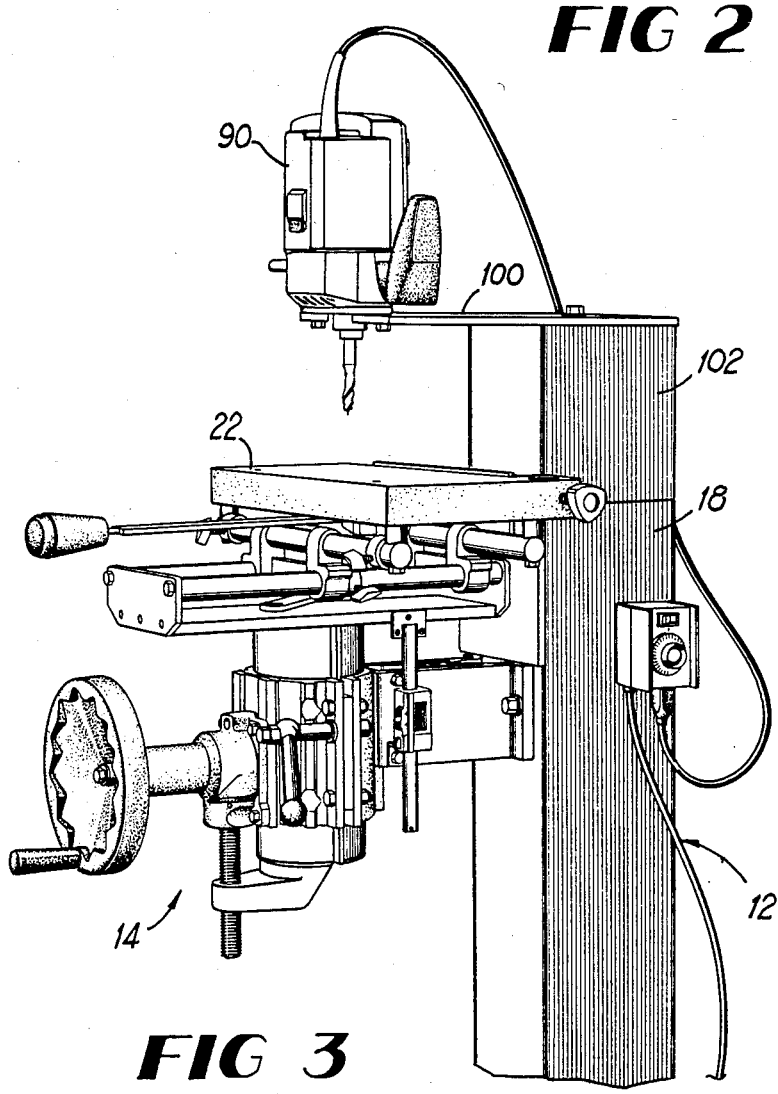
FIG 2
FIG 3

COMBINATION SLOT MORTISING, HORIZONTAL BORING, ROUTER TABLE AND OVERARM ROUTER MACHINE

BACKGROUND OF THE INVENTION

1. Field of the Invention

This invention relates to powered woodworking machinery and attachments for electric routers.

2. Description of the Related Art a. Overview

Consideration of the nature of one of the two basic woodworking processes will illuminate the significant contribution the present invention makes to the ancient and noble art of woodworking.

All woodworking involves only two principal operations and one specialized operation. The principal operations are: (1) removal of wood tissue and (2) joining of wood tissue members. While much tissue removal involves removal of "waste" tissue from a workpiece, some operations, such as shingle splitting, involve *separation* of one "good" piece of wood from another "good" one. Thus, while tissue "separation" might be more descriptive, even this is, however, removal of one bit of wood tissue from another. A few woodworking specialities, including cooperage, musical instrument construction, boatbuilding and chairmaking also involve *bending* wood tissue. In short, things made of wood are made by shaping hunks of tree trunk, by removing and sometimes by bending wood tissue, and by fastening the hunks together.

The vast majority of woodworking tools, like the present invention, perform *solely* the first operation, tissue removal. Examples include the ax, saw, chisel, froe, plane, scraper, knife and coated abrasives ("sandpaper"). All conventional tissue removal tools utilize one or more cutting edges, and control of the cutting edge or edges is necessary to achieve controlled tissue removal. (Laser tissue removal tools "cut" by burning wood tissue.) Interestingly, tool complexity is generally inversely proportional to the skill required successfully to use the tool. ("Skill" is used here to mean muscular and hand-to-eye coordination and is to be distinguished from the understanding required to identify tissue which *should* be removed and to determine *how* a tool must be manipulated in order to accomplish that removal.)

While highly regulated and predictable wood tissue removal is desirable in most woodworking, predictable and regulated tissue removal is relatively difficult utilizing most hand woodworking tools, including both unpowered ones (e.g., handsaws, chisels, hand planes) and powered ones (e.g., hand circular saws, portable electric drills, electric routers). Consequently, the desire to achieve greater *control* of tissue removal has been one of the two principal objectives of wood tissue removal tool development. The quest for control has largely been a story of guides, gauges, fences, stops, carriages, clamps and holders.

While the search for control has been important and continues, it has often been eclipsed by the more dramatic changes in wood tissue removal technology relating to power. All wood tissue removal tools must have a "motive" force or energy source to operate the tool and, most basically, overcome the chemical and mechanical intra- and inter-tissue bonds ultimately derived from solar energy through photosynthesis within the tree from which the wood tissue came.

Historically, virtually all early tools were human or "hand" powered, and many simple tools continue to be hand powered today. As other power sources have been developed or harnessed, they have been utilized to power woodworking tools, resulting, for instance, in animal, water, gasoline and electrically powered tools.

In short, all tissue removal woodworking tool development may be seen as the adaptation of power to and efforts to achieve regulation in tissue removal. Despite the constancy of these objectives through the millenia of historically recorded woodworking, tool evolution continues because of continuing evolution of the technologies, such as metallurgy, used in making woodworking tools, continuing evolution in the technologies for powering them and the interplay among these technologies.

For instance, at the end of the last century, the substantial cost of a high power source of rotary motion, such as a steam or gasoline engine or water mill, coupled with the relatively low cost of iron castings, led to the development and extensive use of line-shaft woodworking shops. In them an entire shop of enormous tools was powered by a single power source through a complex (and dangerous) series of shafts and belts. However, modern electric motors make it far less expensive to dedicate a separate motor to each tool than to transmit rotary mechanical power to every tool from a single source, and thereby render the line-shaft shop obsolete.

The line-shaft shop economy in investment in a single power source remains desirable, nevertheless, even when tools are powered by a directly mounted electric motor, *if* a single motor can be conveniently used for multiple tools or multiple tool function without significant degradation of tool operation. Such an electric motor has only recently become available, largely because of advances in hand controlled power tools. As noted above, however, such hand power tools utilize structures providing for relatively unregulated tissue removal.

Relatively small electric motors have long been used for electric hand drills, which evolved directly from hand powered drills in that an electric motor, rather than a hand powered mechanism, is used to rotate the drill bit. While moderately high-powered electric drills have long been available, they have generally provided high power at the expense of rotational speed.

A related electric hand tool which, like an electric hand drill, also has a chuck mounted on the end of a rotating shaft, is the electric router. It has no exact hand-powered analog because it uses a *rotating* bit to perform tasks accomplished by *linear* motion hand tools, such as the hand router ("old woman's tooth"), rabbit plane, molding plane and chisel. In most instances, the router bit must rotate at a speed far higher than that required for drilling. As electric routers have been called upon to remove larger amounts of wood tissue in more substantial cuts, higher-power models have been developed. Furthermore, the desire to begin a cut without lateral movement, by plunging the bit into a workpiece along its rotating axis, resulted in development of the plunge router. Finally, the recent availability of compact, lightweight electric plunge routers described in more detail below, which use high power universal (ac/dc) motors, has made possible the present invention. In light of the general background set forth above, the present invention can be recognized as a significant advance in the historic effort to achieve highly regulated, controlled and predictable wood tissue removal with a minimum of effort and skill.

b. Plunge Routers and Related Tools

As indicated above, high power, plunge electric routers have come into widespread use in woodworking in recent years. Typical of such machines are the Makita 3612BR and the Hitachi TR12 models of plunge routers. Both use universal (AC/DC) motors which draw approximately 14 amps at 110 volts, and both use closely similar plunge mechanisms. Virtually all electric routers utilize a base which is adjustable with respect to the router motor and chuck mounted on the end of the motor shaft. Thus, with the router off, the position of a router bit mounted in the chuck may be adjusted relative to the base and, consequently, relative to a workpiece against which the base bears. By contrast, the base on a plunge router is mounted on a spring-loaded mechanism to allow relatively significant movement of the base relative to the router bit while the tool is in operation. This is typically achieved by a configuration in which two sleeves mounted on or in the router motor housing travel on two tubes which are mounted on the router base perpendicular to the base and parallel to the motor axis. Springs within the tubes urge the base away from the router motor so that pressing down on handles attached to the motor case or housing and against the base causes the router bit to protrude through the center of the base and to plunge into a workpiece. A lever-actuated lock associated with one of the sleeves is typically used to lock that sleeve against its tube, thereby locking the base in place.

Plunge routers were initially used primarily to make "blind" cutouts by plunging the bit or cutter into the workpiece and then moving it laterally following a pattern, as, for instance, in forming countertop sink cutouts. The utility of the plunge router for making slot mortises by clamping a workpiece in a jig having two rails on which the router base travels between stops was described by Tage Frid in issue no. 30, September 1981, of Fine Woodworking magazine. This article also disclosed the utility of spiral end mills in mortising using a plunge router and contributed to expansion of the popularity of plunge routers.

Such plunge routers are now widely owned by individual woodworkers and small woodworking shops. The same woodworkers periodically need the ability to accomplish slot mortising, horizontal boring and overarm routing operations, but commercially available equipment dedicated to such operations is prohibitively expensive, particularly in view of the relatively modest need individuals and smallshop woodworking operations typically have for such equipment.

Such woodworkers often also need a router table, which is basically a horizontal work surface under which a conventional router may be mounted in order to utilize it as a shaper by moving a workpiece relative to the router bit rather than moving the router and bit relative to the workpiece. Inexpensive router tables are commercially available and may be readily fabricated. However, such tables are frequently inconvenient to use because adjustment of router bit position must be accomplished by adjusting the router on its base, which is difficult to do with the router mounted upside down underneath a router table.

Numerous previous tool configurations have been developed in order to achieve controlled relative movement between a woodcutting tool rotating at high speed and a workpiece. For instance, conventional drill presses accomplish vertical boring with a configuration in which a chuck holding a drill bit travels vertically in order to drive the rotating boring bit into a stationary workpiece. Conventional horizontal boring machines orient the boring bit axis horizontally, and some move the workpiece while others move the bit. However, conventional horizontal boring machines typically bore multiple holes by utilization of multiple bits or by repositioning the workpiece on the boring machine, and not by repositioning the workpiece utilizing controlled movement of a workpiece support relative to the boring bit.

Combined function machines have also previously been developed. For instance, a combination boring, mortising, tenoning and duplicating woodworking tool is described in U.S. Pat. No. 4,593,735 to John C. J. Wirth, Jr. The Wirth machine utilizes a conventional motor or a router as a power source with the shaft mounted horizontally, and a workpiece is mounted on a table which is movable along two orthogonal horizontal axes. The cutting tool is movable in a vertical plane on a parallelogram, together with a follower to follow a pattern, thereby operating somewhat like a pantograph.

An apparatus for cutting dovetail joints is described in U.S. Pat. No. 4,163,465 to Strong. That apparatus comprises generally a vertical mounting plate intended to receive the base of a conventional router, which mounting plate travels vertically relative to a horizontal base. Thus a rotating woodcutting bit mounted above the base in the router may be moved up and down relative to the base to permit repositioning of the bit in order to make successive cuts in a workpiece which is slid along the base against a fence.

A horizontal boring capability is sometimes added to a conventional table saw by mounting a movable table on the side of the saw base adjacent to one end of the saw shaft. A chuck on that shaft receives boring and drill bits. While slot mortising may also be possible in principle using such a configuration, saw motor shafts typically rotate at approximately 3600 revolutions per minute, which is far slower than the appropriate speed for optimal mortising bit or end mill operation in wood.

None of these prior devices succeeds, however, in providing an economical, highly accurate and easily used apparatus for accomplishing horizonal boring, slot mortising, overarm routing and router table/shaping operations.

SUMMARY OF THE INVENTION

The present invention provides an economical combination woodworking machine which utilizes a compact, high speed power source to drive rotating woodcutting tools or bits. In the preferred embodiment, this power source is a plunge router from which the base has been removed. Extensive use of such plunge routers as described above provides a widely available, highly versatile means for driving rotating woodcutting tools which, because of the convenience of its associated attachment mechanism, may be easily attached to and removed from auxiliary equipment configured in accordance with the present invention.

The present invention utilizes an x-y table and a means for rotating a bit such as an electric plunge router, both of which are mounted on a column, and provision is made for changing the relative horizontal position of the router and the x-y table. In the embodiment described below, this is accomplished utilizing an x-y-z table which is also movable along a vertical "z" axis as well as the horizontal "x" and "y" axes. The plunge router may be mounted on the column in different orientations for each of the (1) slot mortising and horizontal boring, (2) over-arm router and (3) router table configurations. This is accomplished by attaching steel dowels to a mounting plate appropriately affixed to the column and by receiving those dowels in the sleeves of the plunge router motor housing. The router is located in place utilizing its own lock and, if desired, an auxiliary threaded rod for safety.

The dowels are mounted horizontally for use of the tool in its slot mortising and horizontal boring configuration. Boring, utilizing conventional wood-boring bits, is possible by reducing the router's normal speed with an electronic speed control. Industrial wood-boring bits having a ½ inch shank which can be locked in a ½ inch router chuck are available in conventional wood-boring bit diameters and thus obviate the need for a Jacobs or other adjustable-diameter chuck.

The steel dowels are mounted vertically above the x-y-z table, in order to suspend the router upright above that table, in the over-arm router configuration. Finally, the dowels are also mounted vertically, but beside the machine column, to suspend the router upside down for the router table configuration. In the router table configuration, an auxiliary work surface is mounted on the x-y-z table so as to over-lie the router and permit router bits to protrude up through a hole in that work surface. Depth of cut adjustments may then be accomplished by raising and lowering the work surface by actuating the x-y-z table along its vertical axis.

The machine resulting from the configurations of components in the present invention provides a very substantial level of control while achieving rapid and efficient wood tissue removal through use of a high power motor.

It is thus an object of the present invention to provide an economical combination woodworking machine which utilizes a plunge router as a power source.

It is a further object of the present invention to enhance the versatility of conventional plunge routers by providing a router attachment which will facilitate highly controlled manipulation of a workpiece relative to the router.

It is another object of the present invention to provide a combination woodworking machine which may be successfully operated by the veritable tyro to remove wood tissue with sparkling success rivaling that conventionally achieved only by a seasoned master of the noble art.

It is a further object of the present invention to amaze and astound knaves and flatlanders, varlets and cretins, and the numerous uninitiated of every persuasion, all to the entertainment of the rabble, thereby seeking to secure the blessings of greater woodworking convenience with control for the enlarged happiness of the general populace.

It is an additional object of the present invention significantly to enhance the control which may be achieved in relative movement of a workpiece and an electric router.

Further objects and advantages of the present invention will become apparent by reference to the drawings, the following detailed description of the invention and the claims.

BRIEF DESCRIPTION OF THE DRAWINGS

FIG. 2 is a perspective detail showing the router mounting plate illustrated in FIG. 1.

FIG. 3 is a perspective view of the combination machine of the present invention shown in its overarm router configuration.

DETAILED DESCRIPTION OF THE DRAWINGS

Figure 1:
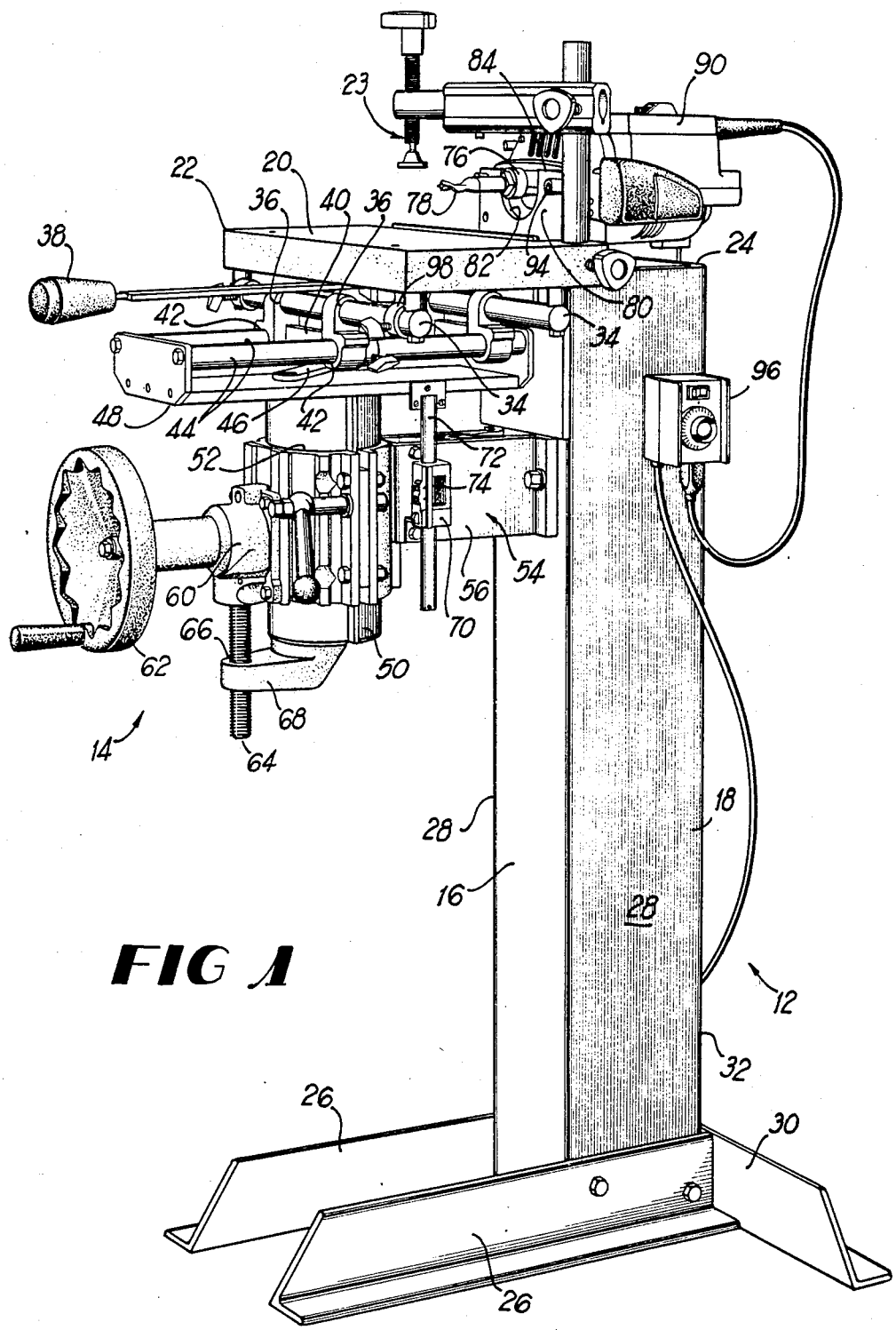
FIG. 1 is a perspective view of the combination machine of the present invention in its slot mortising and horizontal boring configuration.

FIG. 1 illustrates the combination machine 12 of the present invention in its slot mortising and horizontal boring configuration. Two elements of the machine 12 readily identifiable in FIG. 1 are utilized in all configurations. They are x-y-z table mechanism 14, and a base formed by column 18, the two feet 26 and double foot 30.

The x-y-z table mechanism 14 is mounted on the front 16 of a vertical column 18, which may be a section of conventional square steel six inch tubing approximately thirty inches long or any other length appropriate to position table mechanism 14 at a convenient working height. The x-y-z table mechanism 14 is mounted so that the top surface 20 of x-y-z table 22 will be located at approximately the same level as the top 24 of column 18. Two feet 26, which may be fabricated from short lengths of steel angle iron, are affixed to the two opposite sides 28 of column 18 adjacent to the lower end of column 18 and extending generally under x-y-z table mechanism 14 at a right angle to column 18. A third double foot 30 is formed by affixing a section of steel angle iron to the back 32 of column 18 adjacent to the lower end of column 18 and at right angles to column 18 so that portions of foot 30 extend beyond each of the sides 28 of column 18 and the feet 26 and 30 thereby provide convenient and stable support for machine 12.

The x-y-z table mechanism 14 may be any appropriate mechanism adapted to receive a workpiece and move in three orthogonal directions. The x-y-z table mechanism illustrated in the figures is substantially similar to a mechanism available from Robland, Kolvestraat 44, 8000 Brugge, Belgium, and distributed in the United States by Laguna Tools, 2081 Laguna Canyon Road, Laguna Beach, Calif. 92651.

The illustrated x-y-z table mechanism 14 comprises generally a cast metal horizontal table 22 mounted on two x-axis rods 34, which are horizontal steel rods oriented parallel to the front 16 of column 18. The x-axis rods 34 travel in x-axis bushings 36 which are mounted in carriage 40. An x-axis lever 38 is movably attached to both table 22 and carriage 40, thereby permitting the table 22 to be moved back and forth parallel to the front 16 of column 18 by manipulating x-axis lever 38. Carriage 40 also carries y-axis bushings 42, which are oriented along a horizontal axis perpendicular to the axis of bushings 36. The y-axis bushings 42 receive y-axis rods 44, thus permitting carriage 40 to travel along y-axis rods 44, which are parallel horizontal steel rods oriented perpendicular to the front 16 of column 18. The ends of the y-axis rods 44 are held in a U-shaped bracket 48. A y-axis lever 46 is movably attached to both carrage 40 and u-shaped bracket 48. Accordingly, table 22 may be moved toward and away from the front 16 of column 18 by manipulating y-axis lever 46.

The bottom of bracket 48 is mounted on top of traveling column 50. Traveling column 50 is a steel tube which is captured in a bushing portion 52 of table mount 54. Table mount 54 is a metal casting having a leg 56, one end of which is mounted on the front 16 of column 18 and the other end of which carries bushing 52. Mounted on the outer face 58 of table mount 54 is a vertical drive mechanism 60, operated by an elevating knob 62, which may be rotated to drive a vertical screw 64 through a conventional right angle drive train (not shown) within the mechanism 60. Screw 64 extends down from drive mechanism 60 and is received in a threaded hole 66 on an arm 68 attached to the bottom of traveling column 50. Accordingly, as will be readily appreciated by on skilled in the art, rotation of elevating knob 62 results in vertical travel of column 50 and, consequently, in vertical travel of table 22 which is indirectly mounted on column 50 as explained above.

Since accurate measurement of vertical travel of table 22 is frequently desirable, such measurement may be accomplished by affixing a conventional or electronic indicator between mount 54 and bracket 48, as is illustrated by indicator 70 in FIG. 1. Indicator 70 may be a Mitutoyo digital readout available from Mitutoyo Manufacturing Company, Ltd., Landic-Mita Building, 31-19, Shiba 5-Chome, Minato-Ku, Tokyo 108, Japan, available in the United States from MTI Corporation, 45001 Five-Mile Road, Plymouth, Mich. 48170. It comprises a gauge arm 72 rigidly connected to bracket 48 an a readout 74 mounted on table mount 54 to travel along and sense its position on gauge arm 72.

The present invention is assembled in the slot mortising and horizontal boring configuration, as is illustrated in FIG. 1, by mounting a rotating chuck 76 oriented to receive a horizontal bit 78 above table 22. This may conveniently be accomplished in accordance with the present invention by attaching with bolts or other suitable mounting means a generally rectangular steel mounting plate 80 on the front 16 of column 18 so that a portion of the plate 80 extends above the top 24 of column 18. Plate 80, which is separately illustrated in FIG. 2, may conveniently be fabricated by machining a rectangle of ¼ inch mild steel to center a half-round or "D"-shaped incursion 82 on one end 84 of the plate 80 between dowel mounting holes 86. Mounting holes 86 which are centered the same distance apart as the bushings 88 in plunge router 90 which normally receive the sliding tubes on the factory-provided plunge router 90 base (not shown). Dowels 92 are mounted perpendicular to mounting plate 80 by passing bolts 94 through mounting holes 86 and receiving those bolts in threaded holes (not shown) in the ends of dowels 92. By utilizing dowels 92, which may be sections of steel rod, equal in diameter to the tubes on which router sleeves or bushings 88 are intended to travel, it is possible very quickly and conveniently to mount router 90 by removing the factory supplied base and simply sliding router 90 onto dowels 92. The lever-actuated lock typically included on router 90 may then be depressed to lock router 90 in place. Router 90 chuck 76 is received within the incursion 82 in mounting plate 80 to permit the chuck 76 and bit 78 to extend well beyond that mounting plate, thereby providing highly desirable access to the entire working length of bit 78.

For safety, router 90 may additionally be locked on mounting plate 80 by any means for limiting motion of the router 90 away from the plate 80. This may conveniently be accomplished by attaching a threaded rod 83 to mounting plate 80 in the same position relative to dowels 92 as the factory-supplied depth stop rod o router 90 is positioned relative to router 90 base tubes. This will make it possible to receive threaded rod 83 in an existing depth stop hole or opening 85 on router 90 and thus capture router 90 by placing a nut on rod 83.

As will be readily appreciated by one skilled in the art, means for rotating bit 76 other than a conventional router 90 may be used with machine 12 of the present invention. Additionally, alternative methods of mounting a router may be utilized. For instance, both plunge routers and conventional routers may be mounted by bolting the factory-supplied router base to a mounting plate attached to column 18 as described above and having a shape suitable to receive the base. The principal drawback of such an alternative means for mounting a router is that the router chuck will typically be positioned somewhat behind the mounting plate in such a configuration, thereby making less working length of bit 76 available.

As will readily be appreciated by one skilled in the art, slot mortising may be accomplished by mounting an appropriate bit 78 in chuck 76, by mounting a work piece on the top surface of table 22 utilizing hold-down 23 and by driving the workpiece onto bit 78 utilizing y-axis lever 46 and then moving the table 22 and workpiece from side-to-side utilizing x-axis lever 38.

Conventional electric routers rotate far too fast for safe utilization of conventional boring tools such as drill bits. However, the speed of such routers may be reduced utilizing electronic speed controls, such as Dayton power tool speed control model 4X701 available from W. W. Granger, Inc., 5959 W. Howard Street, Chicago, Ill. 60648. Such a speed control 96 may be mounted on a side 28 of column 18, as is illustrated in FIG. 1. The power cord 91 for router 90 is then plugged into speed control 96, thereby making it conveniently possible to control the speed of router 90 and reduce its speed to one appropriate for boring bits. This permits use of the combination machine 12 for horizontal boring.

By setting stops 98, which are merely slidable bushings with set screws mounted on one of the two x-axis rods 34, it is possible conveniently to stop side-to-side motion of table 22 at predetermined points. This makes it possible, among other things, to quickly and easily drill pairs of dowel holes on predetermined centers, which is frequently describe in conventional cabinet construction.

Combination machine 12 is illustrated in its overarm router configuration in FIG. 3. This configuration is achieved by mounting router 90 upright above table 22. This is accomplished by sliding the router 90 onto dowels 92 attached to a long mounting plate 100, which may be the same width and otherwise substantially similar to mounting plate 80, except that it is longer. A column extension 102, which may be a short section of rectangular steel tubing identical to the tubing utilized for column 18, is mounted on top of column 18. Long mounting plate 100 is attached to lie horizontal on the top of column extension 102 so that router 90, also attached to long mounting plate 100, is oriented upright and above table 20. Attachment of column extension 102 to column 18 and attachment of long mounting plate 100 to extension 102 may be accomplished by any conventional means as, for instance, by welding a gusset inside column 18 near the top of column 18 and then passing a bolt or threaded rod through long mounting plate 100, extension 102 and into the gusset in column 18. Suitable locating pins may be welded inside extension 102 to ensure that it seats squarely on top of column 18, as will be readily appreciated by one skilled in the art. Similar pins can be used to locate long mounting plate 100 on column extension 102.

Figure 4:
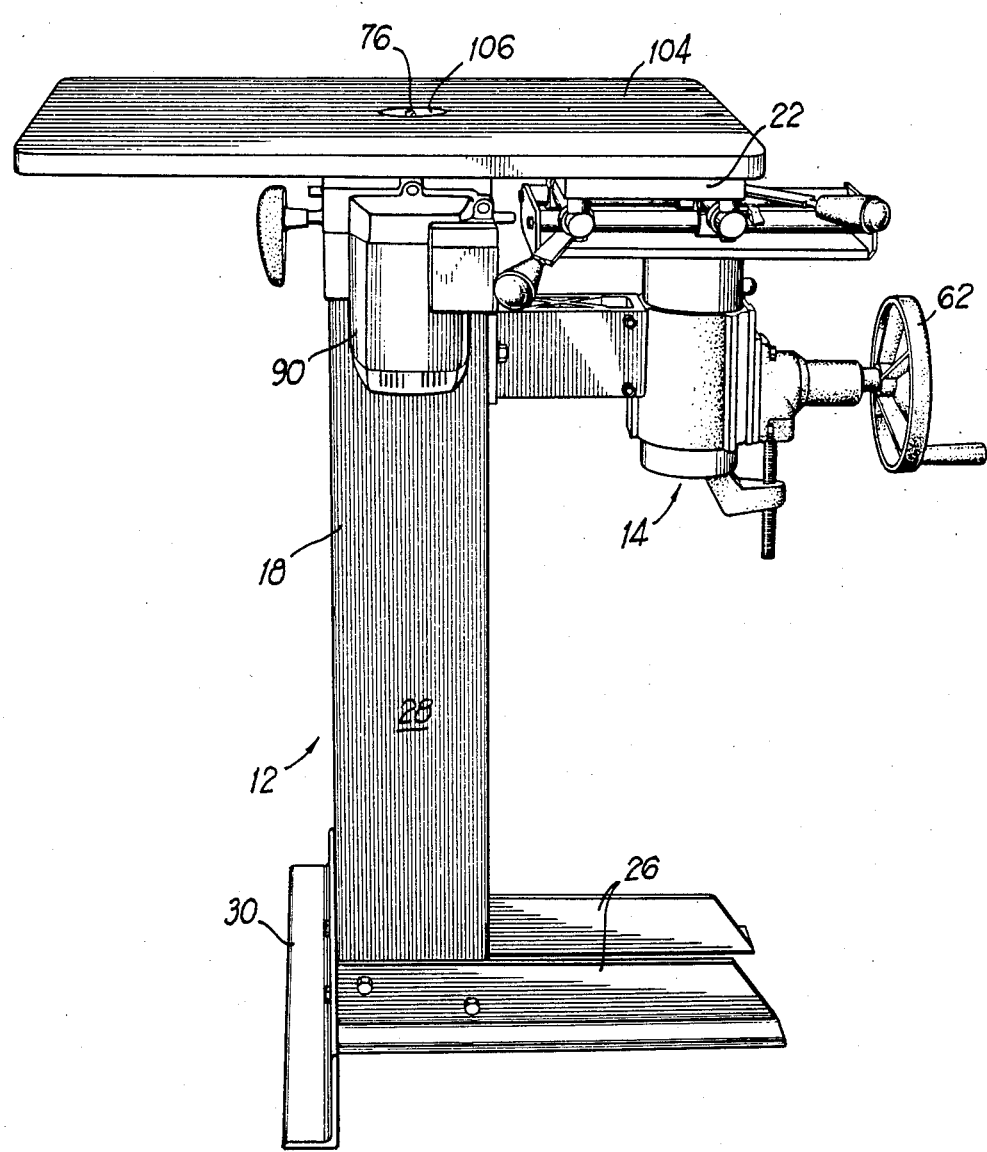
FIG. 4 is a side view of the combination machine of the present invention shown in its router table configuration.

The router table configuration of combination machine 12 is illustrated in FIG. 4. In the router table configuration, router 90 is mounted upside down immediately adjacent to one of the sides 28 of column 90, and an auxiliary table 104 is mounted on x-y-z table 22 to over-lie router 90. A hole 106 is positioned in auxiliary table 104 to permit a router bit 76 to protrude through the auxiliary table 104.

Router 90 may be mounted in the router table configuration simply by reorienting mounting plate 80 to lie on top of column 18, so that the end of mounting plate 80 to which dowels 92 are attached protrudes to one or the other of sides 28 of column 18. Attachment in this configuration may be accomplished by passing a bolt or bolts through holes in mounting plate 80 and into a gusset welded inside of column 18 near the top of column 18.

Machine 12 may be operated in its router table configuration, as illustrated in FIG. 4, by positioning x-y-z table 22 so that hole 106 in auxiliary table 104 is generally co-axial with the chuck 76 of router 90. Depth of cut adjustments may then be made very conveniently by raising and lowering table 22 and auxiliary table 104 by rotating elevating knob 62.

As will be readily appreciated by one skilled in the art, numerous modifications of and additions to combination machine 12 described above may be made without departing from the spirit of the present invention as described in the drawings and text above and defined in the following claims.

I claim:

1. A horizontal boring machine comprising a table mounted on a base having means to move the table along orthogonal x, y and z axes, two dowels mounted on the base to receive an electric router, and an electric router mounted on the dowels, by receiving the dowels in two sleeves in the router motor housing, for holding a bit in a bit holding means in a position above the x-y-z table and rotating the bit about a horizontal axis, a means for controlling the operating speed of the router, and at least one adjustable stop for limiting lateral motion of the x-y-z table relative to the bit.

2. An overarm router comprising a table mounted on a base, having means to move the table along orthogonal x, y and z axes, two dowels mounted on an arm extending from the base above the x-y-z table, and an electric router having a motor housing mounted on the dowels, by receiving the dowels in two sleeves in the motor housing, for holding a bit above the x-y-z table and rotating the bit about a vertical axis.

3. A mortising machine comprising a table mounted on a base having means to move the table along orthogonal x, y and z axes, two dowels mounted on the base, and an electric router having a motor housing mounted on the dowels, by receiving the dowels in two sleeves in the motor housing, for holding a bit in a position above the x-y-z table and rotating the bit at high speed about a horizontal axis and at least one stop for limiting lateral motion of the x-y-z table relative to the bit.

4. A router table comprising an electric router mounted upside-down on a base and a table having a horizontal work surface containing an opening, which x-y-z table is mounted on the base and has a means to move the table along orthogonal x, y and z axes, two of which are horizontal, so that the work surface over-lies the router and the opening may be positioned by movement of the table in the plane of the horizontal axes to be substantially coaxial with the router motor, wherein the router has a motor housing containing two sleeves parallel to the axis of the router motor, and the router is mounted on the base by receiving dowels mounted on the base in the sleeves.

5. A router table in accordance with claim 4, further comprising a means for accurately determining vertical changes in the relative positions of the router and work surface as the work surface is moved toward or away from the router.

6. A combination mortising, horizontal boring, overarm router and router table machine for use with an electric router comprising:
  a. a table mounted on a base having means to move the table along orthogonal x, y and z axes;
  b. a first means for mounting the router on the base so that the router may be oriented horizontally, generally adjacent to and above the x-y-z table in order to perform mortising or horizontal boring;
  c. a second means for mounting the router on the base so that the router may be oriented upside-down generally adjacent to and below the x-y-z table in order to utilize the machine as a router table; and
  d. a third means for mounting the router on the base so that the router may be oriented upright generally above the x-y-z table in order to utilize the machine as an overarm router.

7. A combination machine in accordance with claim 6, wherein each of the first, second and third mounting means includes two dowels spaced apart a distance to permit the dowels to be received in sleeves in the router motor housing.

8. A combination machine in accordance wit claim 7, further comprising a means for accurately determining vertical changes in the relative positions of the router and the x-y-z table as the x-y-z table is moved toward or away from the router.

9. A combination mortising, horizontal boring, overarm router and router table machine for use with an electric plunge router having two sleeves which can travel on two rods attached to the router's base comprising:
  a. a table having means to move along orthogonal x, y and z axes which table is mounted on a square steel tubing column supported by feet;
  b. a first mounting plate for attachment to the column and to two dowels which may be received in the sleeves in order to mount the router on the column (i) horizontally, generally adjacent to and above the x-y-z table in order to perform mortising or horizontally boring or (ii) upside-down generally adjacent to and below the x-y-z table in order to utilize the machine as a router table;
  c. a square steel tubing column extension and second mounting plate for attachment to the column and to two dowels which may be received in the sleeves in order to mount the router upright above the x-y-z table;
  d. an auxiliary table for mounting on the x-y-z table to establish a work surface above the router when it is mounted upside down in the router table configuration; and e. an electronic speed control to provide control of the router's speed.

10. A combination machine in accordance with claim 9, further comprising an electronic digital read-out position indicator attached to the x-y-z table for accurately determining vertical changes in the position of the x-y-z table as the table is moved toward or away from the router.

* * * * *